United States Patent Office 3,522,495
Patented Aug. 4, 1970

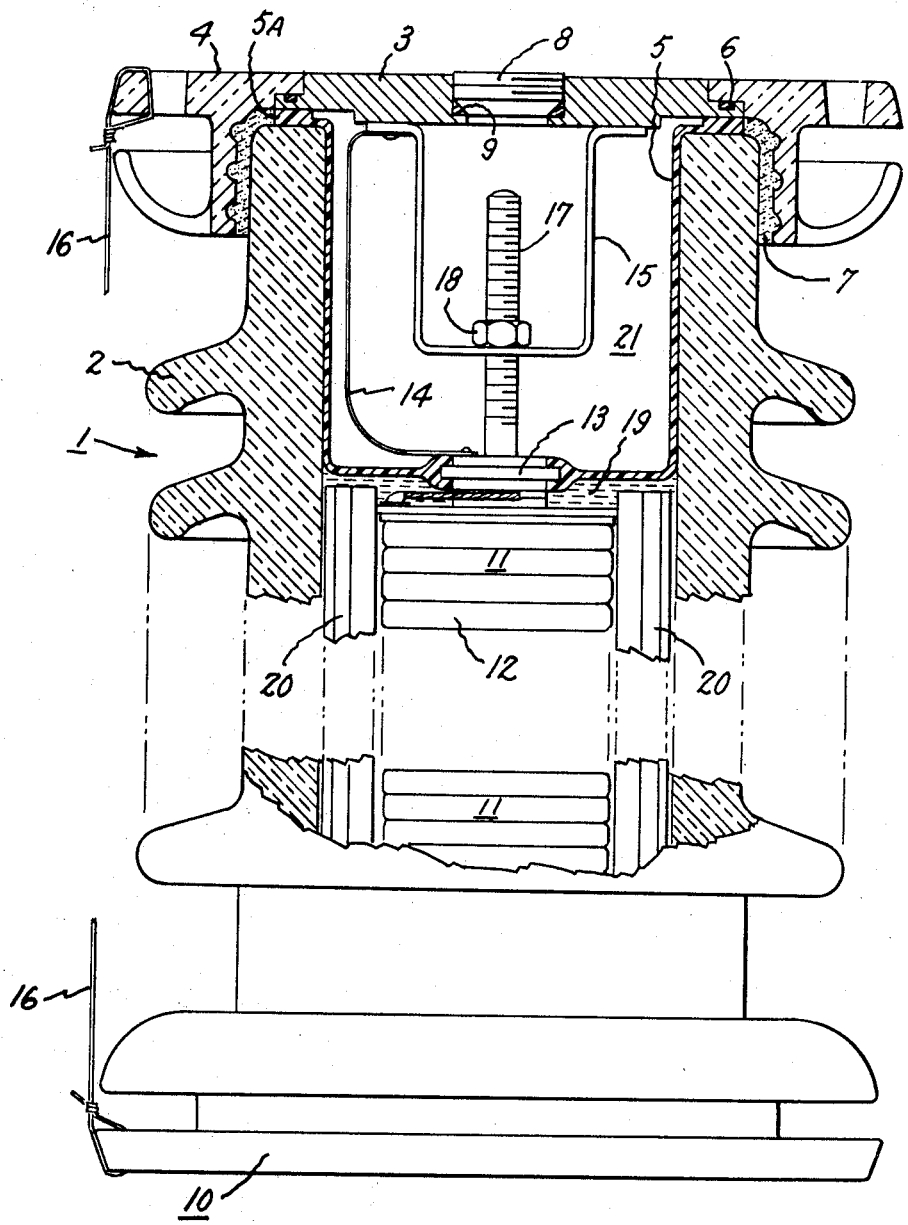

3,522,495
COUPLING CAPACITOR
John C. Devins, Burnt Hills, N.Y., and Wendell T. Starr, Berwyn, Pa., assignors to General Electric Company, a corporation of New York
Filed Nov. 4, 1968, Ser. No. 773,157
Int. Cl. H01g 3/02
U.S. Cl. 317—244                10 Claims

ABSTRACT OF THE DISCLOSURE

A gas-pressurized capacitor comprises a gas-pressurized, insulating container divided into two chambers by a flexible partition made of a moldable fluoropolymer to separate the pressurizing gas, which is one of a specified group of electronegative gases, from the dielectric fluid in which the capacitor units are immersed. The combination provides a capacitor having improved corona starting voltage and dielectric characteristics greatly extending its lifetime.

This invention relates to capacitors and more particularly to capacitors for use in coupling high voltage circuits to carrier current telephone circuits, voltage measuring circuits, and the like.

In the present construction of carrier current coupling capacitors which are used to allow the passing of a high frequency carrier current, but act as a low frequency high voltage insulator, the dielectric fluid is placed under superatmospheric pressure by introducing a gas, generally dry nitrogen, under pressure into the top of the container above the surface of a dielectric fluid in which the assembly or stack of capacitor units are immersed in order to obtain better operating characteristics of the capacitor.

Since it is undersirable to have the gas come in contact with the capacitor units immersed in dielectric fluid, such capacitors must be maintained in their upright position at all times. To prevent the gas from coming in contact with the capacitor units if a particular capacitor should be inverted or turned on the side, it has been proposed to enclose the gas in an expansible chamber constructed of an elastomeric material such as rubber, or a bladder made of a resilient plastic such as Teflon. Construction such as this is shown in U.S. Pat. 2,522,-980, Aitchinson et al. and U.S. Pat. 3,243,673, Leach.

Although such construction does prevent the gas in its separate chamber from coming in contact with the capacitor units immersed in the dielectric fluid when the capacitor is in other than its upright position, such construction does not prevent the gas from slowly diffusing through the plastic or elastomeric material or barrier, which separates the gas from the dielectric fluid, and entering the chamber containing the dielectric fluid. As long as the gas, which has diffused through the barrier, remains dissolved in the dielectric fluid, generally no problems arise unless the dissolved gas has a serious or detrimental effect on the dielectric properties of the dielectric fluid.

Whether the solubility limit of the gas in the dielectric fluid can be exceeded is based on the amount of gas which diffuses into the chamber containing the dielectric fluid and the decrease in pressure on the dielectric fluid. Pressure changes are caused by changes in the ambient temperature of the capacitor. Lower temperatures decrease and higher temperatures increase the pressure. Gas solubility in liquids decreases with a decrease in pressure and vice versa. The effect of temperature on gas solubility in liquids is dependent on the gas and liquid involved. It is possible therefore, to have either short term fluctuations, e.g., between day and night, or long term fluctuations, e.g., between summer and winter, in the ambient temperature of the capacitor used outdoors which have a profound affect on the pressure on the dielectric fluid. Although the gas may be completely dissolved in the one part of such temperature cycle, it could very well exceed its solubility limit during the other part of the temperature cycle. This problem becomes more pronounced with time as more gas permeates the plastic or elastomiric material and dissolved in the dielectric liquid.

When the dielectric fluid containing dissolved gas is subjected to conditions where the gas exceeds its solubility then the excess gas is expelled as small bubbles throughout the entire volume of the fluid. Most of these bubbles nucleate on the capacitor units immersed in the dielectric fluid rather than rising to the surface of the fluid, etc. The gas can displace some of the dielectric fluid from the paper or other porous dielectric separating the capacitor electrodes and become trapped therein. In any case, those regions where there is a mixture of gas bubbles and dielectric fluid, and especially when the gas is air or dry nitrogen, become subject to corona at lower voltage stresses than in those regions of the dielectric fluid where the gas is not present as bubbles. Should corona start, decomposition of the dielectric fluid occurs, descreasing the dielectric strength of the dielectric fluid which finally leads to failure of the capacitor.

It is an object of this invention to provide a new and simple coupling capacitor construction which overcomes the tendency for adverse changes in dielectric properties to occur which can lead to a corona starting voltage decrease due to nucleation of the gas in the dielectric fluid.

It is another object of this invention to provide a coupling capacitor construction which significantly decreases the tendency of the gas to diffuse and dissolve in the dielectric fluid.

It is a further object of this invention to provide a coupling capacitor in which, after many years of operation, even if some gas does nucleate onto the capacitor units, the dielectric strength of the gas will be sufficiently high to prevent an undesirable decrease in dielectric properties or in the corona starting voltage.

The invention will be better understood from the following description taken in connection with the accompanying drawing and its scope will be pointed out in the appended claims.

In the drawing, the figure shows a capacitor, partially in vertical cross-section, constructed in accordance with this invention. In the drawing, there is shown by way of example, a coupling capacitor device 1, constructed with outer insulating shell 2, which may be constructed of porcelain or other suitable insulating material. The upper end of the shell 2 is closed by conducting metal plate 3 and insulating collar 4 made of porcelain or other suitable insulating material. The joint between shell 2 and plate 3 is made gas-tight through gasket 5A which may be separate from or, as illustrated, an integral part of flexible partition 5. The joint between plate 3 and collar 4 is sealed with gasket 6. The annular space between shell 2 and collar 4 is sealed with sulfur or other suitable sealant 7. Plate 3 has screw plug 8 which seats against gasket 9. The purpose of plug 8 is to provide means to gas-pressurize device 1. The lower end of shell 2 is closed with a plate and collar assembly 10 which is identical to that used to close the upper end of shell 2 except the plate does not have plug 8, gasket 9 and, since the lower end of device 1 does not have flexible partition 5, the gasket corresponding to gasket 5A is a separate item.

Within the hollow insulator 2, is mounted a capacitor roll stack 11, which is formed of a stack of small paper and metal foil capacitors 12, all connected in series by conventional means, with the lower unit making electrical contact with the conducting plate in assembly 10 and the top capacitor unit making electrical contact with plate 3, through the circular conducting metal plate 13 in flexible partition 5 and flexible electrical lead 14 which can be fastened either directly to plate 3, or alternatively to yoke 15 as illustrated, which is welded or otherwise suitably fastened to plate 3.

During the assembly of capacitor device 1, pressure is applied to plate 3 and flange 4 to compress gaskets 5A and 6 while sealant 7 is poured in place and allowed to harden. Plate and collar assembly 10 is similarly installed as the base on insulating shell 2. Retaining wires 16 are installed, as illustrated around the periphery to aid in retaining the compression of the gaskets and to strengthen the sealed joints after pressurization of the capacitor device. The pressure used in compression of gaskets 5A and 6 is transmitted to capacitor stack 11 through yoke 15, threaded rod 17 and plate 13. By suitable adjustment of the length of the threaded rod 17, which passes through a threaded hole (not shown) in yoke 15 and is held in the desired position by locknut 18, the amount of pressure bearing on the capacitor stack 11 can be adjusted to any desired value. Alternatively, two nuts 18, on threaded rod 17, one on each side of yoke 15, can be used to adjust the length of rod 17 extending below the yoke when it is not desired to thread the hole in yoke 17.

Prior to final assembly of the capacitor device 1, the capacitor units 12 are suitably impregnated and the annular space between shell 2 and capacitor stack 11 is filled with a suitable dielectric fluid 19, for example, mineral oil. Since generally the cross-section of capacitor units 12 is rectangular and the cross-section of shell 2 is circular, spacers 20, made of suitable insulating material, are used to decrease the amount of void space to be filled with dielectric fluid 19 and to aid in holding the capacitor units 12 in alignment in stack 11. In filling the assembly, the level of the dielectric fluid 19 is brought well above the top of the capacitor stack 11 so that when flexible partition 5 is inserted dielectric fluid 19 will overflow the upper rim of shell 2.

Flexible partition 5, which has circular plate 13 which is integrally molded into its base portion, is inserted along with the associated components previously described. Since the partition 5 is not rigid, its walls partially collapse inwardly towards the vertical axis of device 1 as it displaces some of the oil from the space above the capacitor stack 11 in shell 2. After plate 3 and collar 4 have been installed as previously described and with plug 8 removed, the entire assembly is evacuated followed by admission of the desired gas at the desired pressure for the ambient temperature of the unit, generally to 28 p.s.i.g. in the ambient temperature range of 21 to 25° C., to insure that only the desired gas fills the chamber thus created by flexible partition 5. Plug 8 is then reinserted while maintaining the gas pressure on the unit and is sealed gas-tight by means of gasket 9 with its top surface flush with or below the top surface of plate 3.

During operation of the capacitor so constructed, any expansion of dielectric fluid 19 beyond its initial volume after assembly is accommodated by further collapsing inwardly of flexible partition 5. A contraction of dielectric fluid is accommodated by expansion of flexible partition or diaphragm 5. Sufficient dielectric fluid 19 is used so that at the lowest temperature encountered by device 1, the oil does not contract below the top of stack 11 so that partition or diaphragm 5 is always able to accommodate the expansion and contraction of dielectric fluid 19.

By constructing flexible partition 5 of a moldable fluoropolymer, a flexible partition is provided which has an extremely low permeability for our selected gases. Since partition 5 must be completely free of any pin holes or voids and readily formable into the desired shape, it is necessary to use those fluoropolymers which become sufficiently fluid without decomposition when subjected to heat and pressure that the individual particles of the molding powder completely fuse and coalesce. Such polymers are best described as being heat and pressure moldable fluoropolymers or more simply as moldable fluoropolymers or melt-fabricatable fluoropolymers. These moldable fluorocarbon polymers are well known in the polymer art and generally contain at least 50% fluorine and can be compounded with various dyes, pigments, fillers, etc.

Typical examples of these polymers which are readily available as commercial products and which can be used for partition 5, are the polymers, (which term includes homopolymers, copolymers, terpolymers, or blends of these polymers with each other etc.), of vinylidene fluoride, the polymers of chlorotrifluoroethylene, etc. At the present time, polyvinyl fluoride can not be stabilized sufficiently to permit molding, although it can be fabricated into films by solution casting. Our measurements of the diffusion of our particular gases through such films shows that this polymer would be satisfactory if it could be molded into the required shape.

Polytetrafluoroethylene, although it can be shaped under heat and pressure still requires a sintering step to produce a shaped article sufficiently strong for use. During these steps, the individual particles of the polymer have not become fluid enough to permit them to completely fuse and coalesce. When heated to a temperature where it does melt, it decomposes. Therefore, we exclude such a polymer from the definition of a melt-fabricatable fluoropolymer. However, tetrafluoroethylene can be copolymerized with other fluoro-olefins, for example, hexafluoropropylene, vinylidene fluoride, etc., to produce copolymers, terpolymers, etc., which are readily moldable, even without sintering and, therefore, are included in our definition of moldable fluoropolymers. It is also evident, that they can be described either as copolymers of tetrafluoroethylene, or within the broader definition of the polymers of the fluoro-olefin with which they are copolymerized, e.g., polymers of vinyl idene fluoride, etc.

Although any of the known moldable fluoropolymers are flexible enough to be used for partition 5, those moldable fluoropolymers known as elastomeric fluoropolymers are preferred since they permit gasket A to be made as an integral part of flexible partition 5 and can be cured or vulcanized during molding. Typical of these elastomeric fluoropolymers are the copolymers of vinylidene fluoride and hexafluoropropylene, the copolymers of chlorotrifluoroethylene and vinylidine fluoride, etc. The shape of flexible partition 5 can be a simple cup shape as illustrated or it may be a more complex shape, such as that of an expansible bellow with sinusoidal walls.

The gas used to pressurize the capacitor assembly and inflate partition 5 must be an electronegative gas chosen from the group consisting of sulfur hexafluoride, dichlorodifluoromethane, octafluoropropane, chloropentafluoroethane and octafluorocyclobutane. Since it is desirable that the gas does not liquefy during temperature fluctuations to which the capacitor device 1 is subjected to during use, the choice of the particular gas is based on the expected low temperature to which device 1 is designed to encounter. Of all of the gases that can be used, sulfur hexafluoride is preferred. We have found that this selected group of electronegative gases in combination with the moldable fluoropolymer used in making flexible partition 5, show extremely low permeability of the electronegative gas through the fluoropolymer. We have found that these combinations, have diffusion rates which are extremely low compared to the prior art combination of air, nitrogen and like gases through either fluoropolymers or the other elastomeric or polymeric materials of the prior art.

Representative values of the permeation constant expressed as cm.$^3$ of gas at standard temperature and pressure conditions per second per cm.$^2$ area per mm. thickness per cm. of Hg pressure difference, at both 50° C. and 25° C. are shown in Table I for our combination of gases and moldable fluoropolymers. The permeation constants of other combinations within the scope of our invention are in the range of the values shown for our combinations in Table I. Also shown for comparison purposes are the values for pure, dry $O_2$ and $N_2$ through our fluoropolymers as well as $SF_6$, $N_2$ and $O_2$ through polytetrafluoroethylene (Teflon).

TABLE I

| Gas | Polymer | Permeation Constant, Temperature | |
|---|---|---|---|
| | | 50° C. | 25° C. |
| $SF_6$ | Polytetrafloroethylene | $2.5 \times 10^{-10}$ | $1.6 \times 10^{-10}$ |
| $O_2$ | do | | $4.8 \times 10^{-7}$ |
| $N_2$ | do | | $2.2 \times 10^{-7}$ |
| $SF_6$ | Poly(vinylidenefluoride-hexafluoropropylene) [1] | $8.2 \times 10^{-11}$ | $6.5 \times 10^{-12}$ |
| $N_2$ | do | $1.6 \times 10^{-9}$ | $4.0 \times 10^{-10}$ |
| $O_2$ | do | $2.8 \times 10^{-9}$ | $6.4 \times 10^{-10}$ |
| $SF_6$ | Polyvinylidene fluoride [2] | $9.0 \times 10^{-14}$ | $1.6 \times 10^{-15}$ |
| $CF_2Cl_2$ | do | $3.0 \times 10^{-11}$ | $4.2 \times 10^{-12}$ |
| $C_4F_8$ | do | $4.5 \times 10^{-14}$ | $1.0 \times 10^{-15}$ |
| $N_2$ | do | $1.2 \times 10^{-10}$ | $2.2 \times 10^{-11}$ |

[1] A typical elastomeric fluoropolymer.
[2] A typical fluoropolymer.

It is to be noted that the rates for $O_2$ and $N_2$ are relatively close to each other. Air is essentially a mixture of these gases, the value for air would be intermediate between the values for the pure gases.

The significance of the above data is evident from the following. In a climate such as Phoenix, Ariz., the yearly average temperature is about 50° C., while a general average for all locations is about 25° C. Engineering calculations based on a capacitor designed and constructed for a rating of 161 kv., containing 1780 cc. of gas and 11,300 cc. of oil and a flexible partition having a wall thickness of .09 inch shows that it would take about 10 years at 50° C. and over 100 years at 25° C. for $SF_6$ to have diffused sufficiently through a flexible partition made from an elastomeric copolymer of vinylidene fluoride and hexafluoropropylene to be essentially 63% equilibrated. At this stage of equilibration, quite wide fluctuations in the ambient temperature of the capacitor with the resulting changes in internal pressure of the capacitor would not cause bubbles of $SF_6$ to form in the dielectric fluid. Even longer times are required when polyvinylidene fluoride is used for the flexible partition. The time to reach 63% equilibration is greater than 100 years for $SF_6$ and $C_4F_8$ at 75° C. and for $CF_2Cl_2$ at 25° C. At 50° C., the latter gas requires greater than 25 years to be 63% equilibrated.

On the other hand, $O_2$ and $N_2$ would reach 63% equilibration through the flexible partition of the copolymer of vinylidene fluoride and hexafluoropropylene in less than 6 months at 50° C. and in only slightly over 1 year at 25° C. Even with $SF_6$, polytetrafluoroethylene is unsatisfactory as the flexible partition. This combination reaches 63% equilibration in less than 3 years at 50° C., and in slightly over 5 years at 25° C., which would be too short a time for this combination to be used in this device.

The time to reach equilibration is an exponential function, but for practical purposes can be considered to be reached in four times the time to reach 63% equilibration. The percentages of equilibration after two, three and four times the time to reach 63% equilibration are essentially 87%, 95% and 98%, respectively.

As equilibration is approached, the possibility of bubbles of gas forming in the dielectric fluid with a fluctuation in temperature increases. The solubility of our selected group of gases in dielectric fluids. such as mineral oil, increases as the temperature decreases while just the opposite is true of oxygen and nitrogen. This means that the effect of an increase in temperature on the solubility of our gases is counteracted by the effect of the increased internal pressure in the capacitor (caused by the increased temperature) on the solubility of the gases. Likewise the effect of a decrease in internal pressure (caused by a decrease in temperature) on the solubility of our gases is counteracted by the increase in solubility due to a decrease in temperature. On the other hand, while an increase in temperature favors keeping oxygen or nitrogen in solution, a decrease in temperature creates an adverse additive effect since it decreases their solubility both because of the decrease in solubility with the decrease in internal pressure (caused by the decrease in temperature) and because of the decrease in solubility with a decrease in temperature.

Although it is not desirable to have any gas bubbles in the dielectric fluid, the above data shows that capacitors constructed with our combinations of pressurizing gases and flexible partitions of a moldable fluoropolymer require considerably longer times, as compared to the prior art capacitors, to reach the stage where gas bubbles are likely to form in the dielectric fluid. To be satisfactory the combination of gas and polymer used for the partition must have a permeation constant, as defined above, which is less than $10^{-10}$. Furthermore, even if gas bubbles of our selected gases do form in the dielectric fluid, they would have much less of a detrimental effect on the dielectric properties, including corona starting voltage, than if the gas bubbles were dry air or nitrogen since the dielectric properties are much better than the dielectric properties of dry air or nitrogen.

Accelerated testing by heating over a period of 3 hours to about 100° C., and holding for 12 hours and then cooling to ambient temperature while applying 20% greater than the normal operating voltage to capacitors made according to our invention using a copolymer of vinylidene fluoride and hexafluoropropylene as the flexible partition and $SF_6$ as the pressurizing gas has shown no tendency for the dissipation factor to be adversely affected even after repeated heating cycles. Monitoring of the corona starting voltage also showed that it remained higher than twice the acceptable value. When the flexible partition was omitted and dry nitrogen substituted for $SF_6$, the capacitor showed progressive deterioration of the dissipation factor after each cycle and failed on the sixth cycle.

In another test, a capacitor was made according to our invention, but, prior to installing the flexible partition, $SF_6$ was dissolved in the oil to approximately 40% saturation, the amount calculated to represent the amount of $SF_6$ which would have diffused through the flexible partition made from a copolymer of vinylidene fluoride and hexafluoropropylene and dissolved in the oil during 10 years at relatively severe ambient temperature conditions. The flexible partition was then installed and the capacitor pressurized to 29 p.s.i.g. with $SF_6$ and sealed. Three cycles of heating were carried out under the above described accelerated test with the normal operating voltage and 4 cycles at a voltage of 20% in excess of the normal operating voltage. The gas pressure was released at ambient temperature at the end of the above tests and the capacitor heated again. When the maximum temperature was reached, the gas pressure was again released so that on cooling a negative pressure was created in the capacitor. The capacitor was tested through one cycle under these conditions. No degradation of the dissipation factor or other failures were noted during the entire test period.

It will thus be apparent that all of the recited objects, advantages and features of our invention have been demonstrated as achievable in an entirely practical and economical construction. Furthermore, it will be understood that the herein described embodiments are to be considered merely as illustrative of the invention and that many variations as well as arrangements of the parts comprising the device can be made within the scope of the invention as defined by the appended claims. For example, the high potential terminals may be in the form of a stud rather than a plate. Secondary terminals may be present to aid in monitoring the operation of the device. The shape and form of the partition is not critical, and, if desired can be in the form of a torus open at the top with the inner diameter sealed or molded to the terminal passing through the center. These and other changes will be readily apparent to those skilled in the art.

What we claim as new and desire to secure by Letters Patent of the United States is:

1. A capacitor comprising a gas-pressurized insulating container divided into two chambers by a flexible partition made of a melt-fabricatable fluoropolymer selected from the group consisting of polymers of vinylidine fluoride, polymers of chlorotrifluoroethylene and polymers of hexafluoropropylene, one of said chambers containing a plurality of interconnected capacitor units immersed in a dielectric liquid and the other of said chambers containing an electronegative gas selected from the group consisting of sulfur hexafluoride, dichlorodifluoromethane, octafluoropropane, chloropentafluoroethane and octafluoro cyclobutane under greater than atmospheric pressure.

2. The capacitor of claim 1 wherein the partition is made of a polymer of vinylidene fluoride.

3. The capacitor of claim 1 wherein the partition is made of a polymer of chlorotrifluoroethylene.

4. The capacitor of claim 1 wherein the partition is made of an elastomeric polymer of vinylidene fluoride.

5. The capacitor of claim 1 wherein the partition is made of an elastomeric polymer of chlorotrifluoroethylene.

6. The capacitor of claim 1 wherein the electronegative gas is sulfur hexafluoride.

7. The capacitor of claim 1 wherein the partition is made of a polymer of vinylidene fluoride and the electronegative gas is sulfur hexafluoride.

8. The capacitor of claim 1 wherein the partition is made of a polymer of chlorotrifluoroethylene and the electronegative gas is sulfur hexafluoride.

9. The capacitor of claim 1 wherein the partition is made of an elastomeric polymer of vinylidene fluoride and the electronegative gas is sulfur hexafluoride.

10. The capacitor of claim 1 wherein the partition is made of an elastomeric polymer of chlorotrifluoroethylene and the electronegative gas is sulfur hexafluoride.

References Cited

UNITED STATES PATENTS

| 2,001,873 | 5/1935 | Hansson | 317—242 |
| 2,777,009 | 1/1957 | Whitman. | |
| 3,243,673 | 3/1966 | Leach | 317—244 |

OTHER REFERENCES

The Condensed Chemical Dictionary, Sixth edition, Reinhold, N.Y., 1963, pp. 919 and 1110.

ELLIOT A. GOLDBERG, Primary Examiner

U.S. Cl. X.R.

174—17